United States Patent [19]

Foster et al.

[11] 4,189,345

[45] Feb. 19, 1980

[54] FIBROUS COMPOSITIONS

[75] Inventors: William A. Foster, Midland; Dale M. Pickelman, Auburn; Ritchie A. Wessling, Midland, all of Mich.

[73] Assignee: The Dow Chemical Company, Midland, Mich.

[21] Appl. No.: 825,320

[22] Filed: Aug. 17, 1977

[51] Int. Cl.$^2$ .............................................. D21H 3/38
[52] U.S. Cl. .......................... 162/168 R; 162/168 N; 162/168 NA; 162/169
[58] Field of Search ....... 162/168 R, 168 N, 168 NA, 162/169

[56] References Cited

U.S. PATENT DOCUMENTS

| | | | |
|---|---|---|---|
| 2,563,897 | 8/1951 | Wilson et al. | 162/166 |
| 2,654,671 | 10/1953 | Azorlosa | 162/168 N |
| 2,765,228 | 10/1965 | Jordan | 162/168 N |
| 3,016,325 | 1/1962 | Pattilloch | 162/164 R |
| 3,205,187 | 9/1965 | Vanderhoff | 260/29.7 |
| 3,329,560 | 7/1967 | Sckickl et al. | 162/168 N |
| 3,332,834 | 7/1967 | Reynolds | 162/168 NA |
| 3,694,393 | 9/1972 | Lewis et al. | 260/29.6 |
| 3,926,890 | 12/1975 | Huang et al. | 260/29.6 H |
| 3,937,648 | 2/1976 | Huebner et al. | 162/168 R |
| 3,998,690 | 12/1976 | Lyness et al. | 162/141 |
| 4,017,440 | 4/1977 | Killam | 162/168 N |
| 4,056,501 | 11/1977 | Gibbs et al. | 260/29.65 Q |

FOREIGN PATENT DOCUMENTS 477265 9/1951 Canada .............................. 162/168 NA
1209867 1/1966 Fed. Rep. of Germany .

OTHER PUBLICATIONS

Alincie et al., *J.A.P.S.*, vol. 20, pp. 2209-2219, 1976.

*Primary Examiner*—S. Leon Bashore
*Assistant Examiner*—William F. Smith
*Attorney, Agent, or Firm*—I. A. Murphy

[57] ABSTRACT

A fibrous product containing (a) a papermaking grade of pulp, (b) a structured particle latex having pH independent cationic groups bound at or near the particle surface and (c) a co-additive. The pulp is represented by unbleached softwood kraft. The latex is represented by a structured-particle latex having (a) a core of a copolymer of styrene and butadiene (b) an encapsulating layer of styrene, butadiene and vinylbenzyl chloride which is reacted with 2-(dimethylamino) ethanol to form quaternary ammonium groups. The co-additive is represented by a hydrolyzed polyacrylamide having a degree of polymerization of 5500. To an aqueous slurry of the pulp are added the latex and an aqueous solution of the co-additive, the resulting suspension is dewatered and dried by heating.

8 Claims, No Drawings

FIBROUS COMPOSITIONS

BACKGROUND OF THE INVENTION

(1) Field of the Invention

The invention is concerned with latex systems for use in the manufacture of paper and with paper products containing a dried composite of (a) paper-making pulp, (b) a cationic latex and (c) a water-soluble anionic polymer of acrylamide.

(2) Description of the Prior Art

The use of latex in the manufacture of paper by wet-end addition, or as a beater additive, is well known. Commonly, the latex has been an anionic latex but a water-soluble cationic deposition aid has been used therewith. Because of the slightly anionic nature of pulp, it has been suggested that a low-charge density cationic latex should be used in order to get good deposition on the fibers without the use of a deposition aid.

Combinations of anionic and cationic wet-end additives in which both species are water-soluble are known. However, the combination as wet-end additives of a cationic latex with a water-soluble anionic polymer is not known, particularly latexes having particles with a high density of pH independent bound charge at or near the particle surface.

SUMMARY OF THE INVENTION

The process and product of this invention includes the combination of a paper-making fiber, a cationic latex with a high density of pH independent bound charges and a co-additive which is a water-soluble anionic acrylamide polymer which is not deactivated by polyvalent metal ions to produce a web or sheet, e.g., a paper sheet, with good formation. The latex contains a copolymer of a monovinylidene aromatic monomer, an aliphatic conjugated diene and optionally other non-ionic monomers encapsulated by a thin layer of a water-insoluble organic copolymer having bound charges as pH independent cationic groups. The amount of latex add-on, solids basis, is from about 5 percent to about 2,000 percent, preferably from about 10 percent to about 100 percent, based on the dry fiber weight. The co-additive is used in an amount which usually is from about 0.15 percent to about 160 percent, by weight, based on the weight of the pulp.

The latex has a bound charge of from about 0.15 milliequivalent to about 0.6 milliequivalent, preferably from about 0.18 milliequivalent to about 0.4 milliequivalent, per gram of polymer. The co-additive has a degree of polymerization from about 3000, preferably from about 5000, to about 10,000 and an available charge of from about 0.3 milliequivalent to about 8 milliequivalents, preferably from about 0.7 milliequivalent to about 4.5 milliequivalents, per gram of polymer.

DESCRIPTION OF THE PREFERRED EMBODIMENTS

The latex binder system to make the product of this invention comprises a cationic latex with particles having a high density of bound charges at or near the particle surface and a co-additive which is a water-soluble, high molecular weight, anionic polymer of an acrylamide having a degree of polymerization from about 3000, preferably from about 5000 to about 10,000 and having an available charge of from about 0.3 milliequivalent to about 8 milliequivalents, preferably from about 0.7 milliequivalent to about 4.5 milliequivalents, per gram wherein the anionic polymer retains its solubility when in the presence of metal ions at a pH in the range of from about 4 to about 7. Other constituents of the paper-making composition at the wet-end in the process include a paper-making pulp (generally cellulosic), water, and optionally pigment and other common additives well known in the paper-making art.

By "bound" as applied to groups or charges is meant that they are not desorbable under the conditions of processing. A convenient test is by dialysis against deionized water.

By the term "pH independent groups" as applied to ionic groups is meant that the groups are predominantly in ionized form over a wide range in pH, e.g., 2–12. Representative of such groups are sulfonium, sulfoxonium, isothiouronium, pyridinium and quaternary ammonium groups.

By the term "non-ionic" as applied to the monomers in this specification is meant that the monomers are not ionic per se nor do not become ionic by a simple change in pH. For illustration, while a monomer containing an amine group is non-ionic at high pH, the addition of a water-soluble acid reduces the pH and forms a water-soluble salt; hence, such a monomer is not included. The non-ionic nucleophiles, however, are not similarly restricted, i.e., "non-ionic" as used with nucleophiles applies to such compounds which are non-ionic under conditions of use and tertiary amines, for example, are included.

By "available charge" is meant the amount of charge an ionizable group would provide to a polymer when completely ionized.

Particularly important features of the process for making paper according to the present invention are a high level add-on to the pulp of a cationic latex having a high bound charge together with a water-soluble, anionic co-additive in a synergistic combination. Such a combination especially provides high internal bond strength with accompanying good formation.

The latexes are structured-particle latexes having a non-ionic core of a copolymer of a vinylidene aromatic monomer, an aliphatic, conjugated diene and optionally small amounts of other monomers encapsulated by a thin layer of a water-insoluble organic copolymer having bound charges as pH independent cationic groups.

Latexes prepared by normal emulsion polymerization have high enough molecular weight to be useful. Normally the constituent polymer will have a degree of polymerization of greater than about 1000. The lower limit can be expressed as the start of the plateau region when properties are plotted against molecular weight.

The amount of bound charge in the latex usually is from about 0.15 milliequivalent to about 0.6 milliequivalent, preferably from about 0.18 milliequivalent to about 0.4 milliequivalent, per gram of polymer. Ordinarily, the particle size will range from about 800 Angstroms to about 3,000 Angstroms, more particularly from about 1,200 Angstroms to about 2,000 Angstroms.

The non-ionic copolymer core of the latexes operable in the practice of this invention contains from about 20 percent to about 50 percent of an aliphatic, conjugated diene (preferably 1,3-butadiene), from about 20 percent to about 80 percent of a monovinylidene aromatic compound (preferably styrene), from 0 percent to 5 percent of polar, non-ionic ethylenically unsaturated monomers and from 0 percent to about 25 percent of other ethylenically unsaturated non-ionic monomers which when in the form of homopolymers are water insoluble.

The monovinylidene aromatic compounds are represented by styrene, substituted styrenes (e.g., styrene having halogen, alkoxy, cyano or alkyl substituents), vinyl naphthalene and the like. Specific examples are styrene, α-methylstyrene, ar-methylstyrene, ar-ethylstyrene, α-ar-dimethylstyrene, ar,ar-dimethylstyrene, ar-t-butylstyrene, methoxystyrene, cyanostyrene, acetylstyrene, monochlorostyrene, dichlorostyrenes, other halostyrenes and vinylnaphthalene.

In this specification and claims, by the word "monovinylidene" in the term "monovinylidene aromatic" monomer or compound is meant that to an aromatic ring in each molecule of the monomer or compound is attached one radical of the formula,

wherein R is hydrogen or a lower alkyl such as an alkyl having from 1 to 4 carbon atoms.

The aliphatic conjugated dienes operable in the practice of this invention include butadiene and substituted butadiene and other acyclic compounds having at least two sites of ethylenic unsaturation separated from each other by a single carbon-to-carbon bond. Specific examples are isoprene, chloroprene, 2,3-dimethylbutadiene-1,3, methylpentadiene, and especially 1,3-butadiene (often abbreviated butadiene).

The polar, non-ionic, ethylenically unsaturated monomers are represented by the acrylamides such as acrylamide and methacrylamide; the hydroxyl-containing esters of α,β-ethylenically unsaturated, aliphatic monocarboxylic acids such as β-hydroxyethyl acrylate, β-hydroxyethyl methacrylate, β-hydroxypropyl methacrylate, 4-hydroxybutyl acrylate and 5-hydroxypentyl methacrylate.

The other ethylenically unsaturated non-ionic monomers which when in the form of homopolymers are water-insoluble are represented by the lower alkyl acrylate and methacrylate esters such as methyl acrylate, ethyl acrylate, methyl methacrylate, ethyl methacrylate, isopropyl methacrylate; and the unsaturated nitriles such as acrylonitrile and methacrylonitrile.

In one method for the preparation of latexes useable in the practice of this invention, a known starting latex of a non-ionic polymer of a monovinylidene aromatic compound and an aliphatic conjugated diene is encapsulated with a thin layer of copolymer of an ethylenically unsaturated activated-halogen monomer either by adding the activated-halogen monomer or a mixture of such monomers to the reaction mixture of the starting latex before all of the monomers are converted to polymer or by adding the activated-halogen monomer together with one or more hydrophobic monomers to a starting latex containing essentially no residual monomers, and initiating and continuing polymerization of the thus-added monomers to substantially complete conversion. The resulting latex, having a particle size (diameter) of from about 800 Angstroms to about 3,000 Angstroms consists of the starting latex particle now encapsulated with a bound layer having a thickness of from a monomolecular layer of the copolymer to about 100 Angstroms. The latex according to the foregoing description can then be reacted with a low molecular weight, non-ionic, water-stable, nucleophilic compound which can diffuse through an aqueous phase, to form particles of polymer having pH independent cationic groups, i.e., onium ions, chemically attached at or near the particle surface.

Representative specific nucleophilic compounds are pyridine, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, trimethylene sulfide, thiacyclohexane, tetrahydrothiophene, N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, tri-hydroxyethylamine, triphenylphosphorus, and N,N,N-dimethylphenethylamine.

In carrying out the reaction between the nucleophilic compound and the particles of latex having activated halogens chemically bound to the surface thereof, the latex is stirred gently while the nucleophilic compound is added thereto, as the compound per se or in the form of a solution. Gentle stirring may continue throughout the ensuing reaction, or optionally after dispersion of the compound in the latex, the stirring may be discontinued. The reaction is conveniently carried out at ambient temperature although temperatures from about 0° C. to about 80° C. can be used. The reaction occurs spontaneously at a rate which depends upon the reactivity of the activated halogen and of the nucleophile. It is preferred to carry out the reaction until a predominant proportion of the colloidal stability of the product is provided by the resulting chemically bound cationic groups. Usually a catalyst is not required although with the less reactive materials, a small amount of iodide ion may be used to facilitate the reaction. When a desired degree of reaction is reached, any excess nucleophile commonly is removed by standard methods, e.g., dialysis, vacuum stripping and steam distillation.

Other pH independent cationic groups can be substituted for cationic groups which are chemically bound to the latex particles according to the foregoing description by carrying out a further reaction with such cationic groups. For example, a cationic structured-particle latex having sulfonium groups chemically bound to the structured-particles at or near the particle surface can be reacted with hydrogen peroxide at a temperature of from about 20° C. to about 80° C., preferably at ambient temperature, for a sufficient time to oxidize part or all of the sulfonium groups to sulfoxonium groups. Such treatment also reduces the odor of the latex. For best results in such oxidation reaction, the hydrogen peroxide is used in excess, e.g., from 2 to 10 moles of hydrogen peroxide for each mole of sulfonium groups.

A more complete description of this and related structured-particle latexes and method of preparation is found in the copending application of Gibbs et al., Ser. No. 569,723 filed Apr. 21, 1975 now U.S. Pat. No. 4,056,501, which is incorporated herein by reference.

The latexes can contain usual additives such as antifoamers, coalescing solvents, pigments, and pH adjusting agents. It is preferred that the latexes are soap-free but guantities up to about 0.1 milliequivalent per gram can be tolerated.

The latex is added in an amount greater than that required to cause charge reversal on the fiber but less than the amount which would exceed the capacity of the fiber to hold a mat together during processing. Such an amount of latex usually is from about 5 percent to about 2000 percent, preferably from about 10 percent to about 100 percent, dry basis calculated on the weight of the fiber.

The co-additive to be used together with the cationic latex in the practice of this invention is a water-soluble, high molecular weight anionic polymer of an acrylamide having a degree of polymerization from about 3000, preferably from about 5,000 to about 10,000 having an available charge of from about 0.3 millequivalent to about 8 milliequivalents, preferably from about 0.7 milliequivalent to about 4.5 milliequivalents, per gram wherein the anionic acrylamide polymer retains its water-solubility in the presence of polyvalent metal ions at a pH in the range of from about 4 to about 7. The acrylamide polymer has non-ionic hydrophilic groups and also has an anionic charge because of the presence of anions, such as carboxyl groups or sulfate (sulfonate) groups. Various known methods can be used to obtain these anionic acrylamide polymers. For example, polyacrylamide can be hydrolyzed to various levels. Other methods include direct copolymerization of substituted acrylamide monomers such as 2-acrylamido-2-methylpropane sulfonic acid or with other hydrophilic monomers such as the $\alpha,\beta$-ethylenically unsaturated carboxylic acids represented by acrylic acid, methacrylic acid, fumaric acid, maleic acid and itaconic acid.

The acrylamide polymer co-additive has a molecular weight high enough to flocculate the fines but low enough to avoid poor formation. If the degree of polymerization is less than about 3000, flocculation is inadequate and drainage is poor. If the degree of polymerization is over about 10,000, the flocculation is excellent but paper formation is generally unsatisfactory. The optimum charge on the co-additive depends somewhat on the hardness of the water used, i.e., the concentration of multivalent cations such as $Ca^{++}$ in the water. Generally, polymers of low available charge content, such as less than about one milliequivalent of available charge per gram (meq/g) of polymer, work best in hard water. However, in soft water, better results are obtained when the anionic acrylamide polymer has greater than one meq./g of the anionic group.

The minimum amount of co-additive is determined by the amount of latex which is added beyond the charge reversal point of the fiber. It is preferred to use more than the minimum amount. The operable range for the amount of the co-additive is an amount greater than that required to cause essentially complete retention of the latex on the fiber but less than the amount which would be effective to start redispersion of components of the aqueous suspension. Such an amount usually is from about 0.15% to about 160%, based on the dry weight of the pulp.

The fiber used in the practice of this invention is a paper-making pulp or blend of pulps, i.e., the common grades such as unbleached sulfite pulp, bleached sulfite pulp, unbleached sulfate pulp, semibleached sulfate pulp, bleached sulfate pulp, and in some instances groundwood.

The process to prepare the product of this invention preferably is carried out as follows: A dilute aqueous suspension of the fiber is formed in the normal manner often in a concentration of from about 0.5 percent to about 6 percent. The latex is added at any convenient concentration, often in the concentration as supplied and the resulting mixture is stirred, usually for at least two minutes depending somewhat on the equipment available. The aqueous suspension usually is then diluted further, often with white water from the process. The co-additive is added as an aqueous solution at a concentration usually less than about 1 percent solids and the mixture is stirred generally for near the minimum time to obtain thorough mixing. While the co-additive is usually and preferably the last component added at the wet-end of the process, it may be added at any time. Optional wet-end additives can be added at a suitable time.

Webs or sheets are prepared from the resulting suspension on a paper machine such as a Fourdrinier machine or a cylinder machine or in a laboratory sheet forming apparatus. With such equipment a web or sheet is formed by flowing the aqueous suspension over a support such as a screen to form a wet web, dewatering the web and completing drying by heating. The sheets or webs are fibrous compositions having the fibers distributed uniformly through the thickness and preferentially oriented in the plane of the sheet or web. The fibers are strongly bonded to a polymer phase comprised of a mixture of thermally deformed particles derived from a structured-particle latex and an anionic polyacrylamide of the kinds described more fully above. The sheets or webs can have any desired thickness but usually the thickness is not greater than about 3 millimeters.

The product of the invention provides good internal bond strength accompanied by good formation of the sheet. The "formation" of a sheet of paper refers to the uniformity of distribution of fibers in the sheet. Poor formation occurs when the fibers flocculate or clump together causing alternating heavy and light spots in the sheet. Besides diminishing the aesthetic appeal of the paper, poor formation tends to decrease in-plane strength properties such as tensile strength. Poor formation causes uneven surfaces which contribute to poor printability.

Tests referred to in the examples were carried out as follows:

Canadian Standard Freeness (CSF)

The values are determined according to TAPPI Standard T 227-M-58 except where variations in the procedure are indicated.

Delamination Resistance

The internal bond strength of the products is measured by the delamination resistance test. In this test, a strip one inch in width of the product to be tested is placed between two strips of adhesive tape having sufficient adhesiveness that failure will occur in the paper when the two pieces of tape are pulled apart. Delamination is started by hand, then continued and measured by an Instron Tensile Tester using a jaw separation rate of 12 inches per minute. The average force resisting delamination over a length of about four inches is determined for each of two samples. The average of the two samples is recorded in ounces per inch of width, abbreviated oz/in. Those values are followed in parenthesis by conversion to metric units, i.e., grams per 2.54 centimeters (g/2.54 cm). When a different testing tape is used, the new tape is calibrated according to the initial tape and values are reported in values according to the initial tape.

Formation

A common way to measure formation is to compare visually the sheet to be measured with a set of ten standard sheets specifically made with decreasing levels of uniformity of fiber distribution (formation) and ranked from 1 to 10 with 1 being the best and 10 the worst. Alternatively, optical instruments, which are available commercially can be used for measuring formation.

In this specification and claims, all references to degree of polymerization (DP) are weight average unless otherwise indicated.

The following examples illustrate ways in which the present invention may be carried out, but should not be construed as limiting the invention. All parts and percentages are by weight unless otherwise expressly indicated.

EXAMPLES 1 and 2

An aqueous dispersion containing 1393 parts of water having a hardness of 106 ppm (calculated as calcium carbonate) and an alkalinity of 48 ppm (calculated as calcium carbonate) and 7 parts (dry basis) of unbleached Canadian softwood kraft having a Canadian Standard Freeness (CSF) of 400 ml. was stirred at such a rate that the kraft was just turning over gently. To the moving kraft suspension was added 1.4 parts (dry weight basis) of a latex of the kind described below. After stirring at the same rate for an additional two minutes, a dilute aqueous solution (0.2% solids) of the specified co-additive was added in the amount shown in Table I and stirring was continued for an additional 30 seconds. The resulting furnish was made into a handsheet (12 inches × 12 inches) on an M/K Systems "Mini-Mill" handsheet machine using water for dilution of the description given above. The handsheet was pressed to a solids content of from 37 to 38% by placing the sheet and couching blotter between two pieces of wool felt and running the resulting sandwich through the press at medium speed using a press pressure of 80 psig. The pressed sheet was removed from the wool felts, and stripped from the couching blotter, then dried in a drier maintained at 220° F. (104° C.). The product was just cockle free, and contained about 95 percent solids.

The latex used in the foregoing experiment was a structured-particle latex having 80 percent of (a) a core polymer of 35 percent of butadiene, 65 percent of styrene and 20 percent of (b) an encapsulating layer of 35 percent of butadiene, 15 percent of styrene and 50 percent of vinylbenzyl chloride which was reacted subsequent to polymerization with 2-(dimethylamino)ethanol to provide a bound quaternary ammonium charge of 0.365 milliequivalent per gram of polymer in the latex.

The co-additive (A) used in the example is a hydrolyzed polyacrylamide having 1.94 milliequivalent of available charge per gram and a degree of polymerization of 5500.

For comparison with the above example of the invention, a sheet was prepared in the same manner except for co-additive (A) there was substituted co-additive (B), a hydrolyzed polyacrylamide having the same available charge but having a degree of polymerization of 25,000, i.e., outside the range required for this invention. A further comparison (1B) was made in the same manner and with the same components except the co-additive was omitted. Data are shown in Table I below.

TABLE I

| Example No. | Co-Additive Kind | Co-Additive $DP^{(a)}$ | Co-Additive Available Charge meq/g | Amount $\%^{(b)}$ | $CSF^{(c)}$ ml | Transmission$^{(d)}$ % | Formation Rating | Delamination Resistance oz/in | Delamination Resistance (g/2.54 cm) |
|---|---|---|---|---|---|---|---|---|---|
| 1 | A | 5500 | 1.94 | 0.6 | 505 | 76 | 2 | 22.7 | (644) |
| 2 | A | 5500 | 1.94 | 1.2 | 550 | 87 | 2 | 24.1 | (683) |
| *1A | B | 25000 | 1.94 | 0.6 | 673 | 73 | 7 | 25.6 | (726) |
| *1B | None | | | — | 415 | 23 | 1 | 20.9 | (593) |
| *2B | B | 25000 | 1.94 | 1.2 | 723 | 97 | 10 | 32.5 | (921) |

*Not an example of the invention.
$^{(a)}$Degree of polymerization.
$^{(b)}$Based on weight of kraft.
$^{(c)}$At 3.6 g total solids, uncorrected for temperature.
$^{(d)}$425 Millimicrons, 19 mm cell vs deionized water.

The turbidity measurements are made on the effluent from the freeness (CSF) test and are indicative of the "white water" characteristics which are obtained in the paper making process.

The sheets from Examples 1 and 2 were acceptable in all the properties measured. Comparative examples 1A and 2A were deficient in formation and therefore are unacceptable. While comparative example 1B indicated good formation, the transmission was low indicating poor flocculation onto the fibers and additionally the delamination resistance was low.

EXAMPLES 3-6

Sheets were prepared as described in Examples 1 and 2 except different latexes and a different co-additive in two different amounts were used as shown in Table II. The latexes used (Latex C and Latex D) were structured particle latexes prepared according to the method disclosed and claimed in application Ser. No. 569,723 filed Apr. 21, 1975, now U.S. Pat. No. 4,056,501. The latex particles contained 70% of a core copolymer consisting of 65% of styrene and 35% of butadiene modified with 0.2% of dodecanethiol and the core was encapsulated (capped) with 30% of a copolymer of 50% of vinylbenzylchloride, 35% of butadiene and 15% of styrene which was subsequently reacted with an excess of dimethylsulfide. The latter reaction was stopped for Latex C by vacuum distilling the excess dimethyl sulfide when the bound charge of sulfonium group was 0.195 milliequivalent per gram and for Latex D when the bound charge was 0.388 milliequivalent per gram.

The co-additive was a hydrolyzed polyacrylamide having an available charge of 3.3 milliequivalents per gram as carboxyl groups and having a degree of polymerization of 4100. Data are shown in Table II.

COMPARATIVE EXAMPLES 3C and 5C

Sheets were prepared as described for Examples 3 and 5 except no co-additive was used. Data are included in Table II.

TABLE II

| Example No. | Latex Kind | Latex Bound Charge meq/g | Co-Additive Amount %[a] | Formation Rating | CSF ml | Transmission % | Delamination Resistance oz/in | Delamination Resistance (g/2.54 cm) |
| --- | --- | --- | --- | --- | --- | --- | --- | --- |
| 3 | C | 0.195 | 0.3 | 2 | 520 | 74 | 26.4 | (748) |
| *3C | C | 0.195 | none | 1 | 390 | 16 | 23.2 | (658) |
| 4 | C | 0.195 | 0.6 | 2 | 580 | 69 | 26.5 | (751) |
| 5 | D | 0.388 | 0.3 | 2 | 500 | 31 | 23.5 | (666) |
| *5C | D | 0.388 | none | 1 | 420 | 10 | 21.5 | (610) |
| 6 | D | 0.388 | 0.6 | 2 | 580 | 87 | 27.2 | (771) |

*Not an example of the invention.
[a]Based on dry weight of fiber.

Examples 3–6 illustrate the practice of this invention using a different kind of cationic bound charge than in Examples 1 and 2 and also illustrate the use of widely differing amounts of bound charge.

That which is claimed is:

1. A wet-laid fibrous web having good formation comprising a dried composite containing (a) a papermaking grade of fiber having an anionic charge (b) from about 5 percent to about 2000 percent, solids basis calculated on the weight of the fiber, of a structured-particle latex having a non-ionic core of a copolymer of from about 20 percent to about 50 percent of an aliphatic, conjugated diene, from about 20 percent to about 80 percent of a monovinylidene aromatic compound, from 0 percent to about 5 percent of polar, non-ionic ethylenically unsaturated monomers and from 0 percent to about 25 percent of other ethylenically unsaturated, nonionic monomers which when in the form of homopolymers are water-insoluble; said non-ionic core being encapsulated by a thin layer of a water-insoluble organic copolymer having bound charges of pH independent cationic groups; said latex having from about 0.15 milliequivalent to about 0.6 milliequivalent of bound charge per gram of polymer in the latex and (c) from about 0.15 percent to about 160 percent, based on the weight of the fiber, of a co-additive which is a water-soluble anionic polymer of an acrylamide having a degree of polymerization of from about 3000 to about 10,000 and having an available charge of from about 0.3 milliequivalent to about 8 milliequivalents per gram of co-additive wherein the co-additive retains its water solubility in the presence of polyvalent metal ions at a pH from about 4 to about 7; said latex and said coadditive having been added before laying down of the web; all percentages being by weight.

2. The fibrous web of claim 1 which is a sheet.

3. The fibrous web of claim 1 in which the amount of the structured-particle latex is from about 10 percent to about 100 percent of the amount of the fiber, calculated on a dry weight basis.

4. The fibrous web of claim 1 in which the amount of available charge of the co-additive is from about 0.18 to about 0.4 milliequivalent per gram.

5. The fibrous web of claim 1 in which the degree of polymerization of the co-additive is from about 5000 to about 10,000.

6. The fibrous web of claim 1 in which the fiber is unbleached softwood kraft.

7. A fibrous wet-laid web according to claim 1 in which the pH independent cationic groups are quaternary ammonium or sulfonium.

8. The fibrous wet-laid web of claim 1 in which the latex is prepared by steps comprising emulsion polymerization.

* * * * *